US010926879B2

(12) United States Patent
Bonnefoy et al.

(10) Patent No.: US 10,926,879 B2
(45) Date of Patent: Feb. 23, 2021

(54) DEVICE FOR CLOSING A PASSAGE BETWEEN TWO SEAT UNITS

(71) Applicant: Safran Seats, Plaisir (FR)

(72) Inventors: Bastien Bonnefoy, Issoudun (FR); Patrick Herault, Saint Hilaire en Lignieres (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 16/500,990

(22) PCT Filed: Mar. 5, 2018

(86) PCT No.: PCT/EP2018/055333
§ 371 (c)(1),
(2) Date: Dec. 24, 2019

(87) PCT Pub. No.: WO2018/184778
PCT Pub. Date: Oct. 11, 2018

(65) Prior Publication Data
US 2020/0122838 A1  Apr. 23, 2020

Related U.S. Application Data

(60) Provisional application No. 62/481,224, filed on Apr. 4, 2017.

(51) Int. Cl.
*B64D 11/06* (2006.01)
*B64D 11/00* (2006.01)

(52) U.S. Cl.
CPC ...... *B64D 11/0606* (2014.12); *B64D 11/0023* (2013.01)

(58) Field of Classification Search
CPC ............ B64D 11/0606; B64D 11/0023; E05Y 2900/132; E05Y 2201/64; E05Y 2201/214;
(Continued)

(56) References Cited

U.S. PATENT DOCUMENTS 3,829,929 A * 8/1974 Foltz .................... E05D 15/063
16/97
4,359,080 A * 11/1982 Brydolf .................. E05D 15/26
160/183
(Continued)

FOREIGN PATENT DOCUMENTS

EP         3225548        10/2017
WO      2004038154         5/2004
(Continued)

OTHER PUBLICATIONS

International Patent Application No. PCT/EP2018055333, Search Report and Written Opinion, dated May 18, 2018.
(Continued)

*Primary Examiner* — Justin B Rephann
(74) *Attorney, Agent, or Firm* — Kilpatrick Townsend & Stockton LLP

(57) ABSTRACT

The invention relates mainly to a closure device, notably for closing a passage formed in a cabin of an aircraft, comprising:
  a support means that is able to slide along a slideway in a sliding direction,
  a closing wall that is able to close off the passage, and
  a locking system that is able to take up a locked state, in which the locking system ensures a mechanical connection between the closing wall and the support means, such that the closing wall is movable with the support means in the sliding direction,
characterized in that, notably in the case of a malfunction, the locking system is able to pass into an unlocked state, in which the closing wall is disconnected from the support means, such that the closing wall is movable on its own in the sliding direction.

11 Claims, 9 Drawing Sheets

(58) Field of Classification Search
CPC .. E05D 15/063; E05D 15/632; E05D 15/0652
See application file for complete search history.

(56) References Cited

U.S. PATENT DOCUMENTS

| | | | | |
|---|---|---|---|---|
| 5,404,675 | A * | 4/1995 | Schmidhauser | E05D 15/063 16/87.4 R |
| 5,873,205 | A * | 2/1999 | Hanlon | E04B 2/7416 49/158 |
| 6,209,171 | B1 * | 4/2001 | Pelletier | E05D 15/063 16/87 R |
| 7,117,559 | B1 * | 10/2006 | Barber | E05D 15/063 16/97 |
| 2013/0241247 | A1 * | 9/2013 | Wallace | B64D 11/06 297/118 |
| 2015/0211276 | A1 * | 7/2015 | Gabriel | E05D 13/00 49/456 |
| 2016/0298370 | A1 * | 10/2016 | Druckman | B64D 11/0606 |
| 2017/0106980 | A1 * | 4/2017 | Kuyper | B64D 11/0604 |
| 2017/0283064 | A1 * | 10/2017 | Robinson | B64D 11/0023 |
| 2018/0281963 | A1 * | 10/2018 | Dowty | B64C 1/1461 |
| 2019/0210733 | A1 * | 7/2019 | Herault | B64D 11/0641 |
| 2019/0233114 | A1 * | 8/2019 | Fullerton | B64D 11/0023 |
| 2019/0329891 | A1 * | 10/2019 | Bonnefoy | B64D 11/0606 |

FOREIGN PATENT DOCUMENTS

| | | |
|---|---|---|
| WO | 2014155353 | 10/2014 |
| WO | 2015167949 | 11/2015 |

OTHER PUBLICATIONS

International Patent Application No. PCT/EP2018/055333, English Translation of Written Opinion of the International Searching Authority, dated Oct. 8, 2019.

* cited by examiner

DEVICE FOR CLOSING A PASSAGE BETWEEN TWO SEAT UNITS

The present invention relates to a closure device for closing a passage between two seat units. The invention is particularly advantageously used in the field of aircraft.

The "Business Class" type of seat offers passengers different comfort positions, from a "sitting" position to a "lying down" position in which the seat creates a substantially horizontal lying surface such that the passenger can stretch out.

Intermediate comfort positions are also proposed, such as the "relax" position in which a backrest of the seat is heavily reclined. Generally, these intermediate positions are obtained by the inclination of the backrest, which pivots about a horizontal axis that is perpendicular to an extension axis of the seat. The passenger can then remain on the seat during transitions between the different positions.

The seat generally consists in particular of the backrest and a seat surface, and may comprise a leg rest and/or a footrest, which can be secured or linked to the seat kinematics.

Certain "Business Class" aircraft cabin seating arrangements comprise a passage which is arranged between two seats which are arranged one behind the other along a longitudinal axis of the aircraft cabin and allows direct access to an aisle for all passengers. Passengers can thus easily access the aisle, in particular when the seat is in the "lying down" position.

As a result, when a passenger or crew member is walking in the aisle located beside the seat, in particular toward the rear of the aircraft cabin, they are likely to be in direct visual contact with the passenger sitting in the seat. This situation can give the seated passenger a sense of discomfort, since it feels as if there is a lack of privacy.

EP3225548 describes a device for closing a passage between two seats which are arranged one behind the other along a longitudinal axis of the aircraft cabin, comprising a door that is mounted so as to slide between a stowed position in which the door leaves the passage open and an extended position in which the door closes the passage. A configuration of this kind makes it possible to define a closed interior space around the seat, giving the passenger a sense of privacy. In particular, a configuration of this kind according to the prior art allows the passenger sitting on the seat to avoid being in the direct view of other passengers and/or crew members walking in the aisle.

In the event of a malfunction of the closure device described in EP3225548, the passenger can pivot the door about a vertical hinge to open the space between the seats and access the aisle. However, in a configuration of this kind, the door is likely to obstruct the passage when it is pivoted relative to its usual position. In addition, the closure device described in EP3225548 requires the door to be sufficiently extended so that the hinge protrudes from a storage slot, which is not always possible in the event of a significant malfunction of the closure device.

The invention seeks to effectively overcome these drawbacks by proposing a closure device, in particular for closing a passage in an aircraft cabin, comprising:
- a support means capable of sliding along a slide in a sliding direction,
- a closure wall capable of closing the passage, and
- a locking system capable of assuming a locked state in which the locking system provides a mechanical connection between the closure wall and the support means, such that the closure wall is movable together with the support means in the sliding direction, characterized in that, in particular in the event of a malfunction, the locking system is capable of moving into an unlocked state in which the closure wall is disconnected from the support means, such that only the closure wall is movable in the sliding direction.

Therefore, by allowing the closure wall to slide during unlocking of the system, the invention makes it possible to prevent the passengers' path being obstructed in the event of an evacuation procedure. Furthermore, the invention can be used regardless of the extended length of the closure wall, which makes it easier to use in emergency situations.

According to one embodiment, the locking system comprises at least one stud, in particular provided with a head, which is capable of cooperating
- with at least one holding zone when the locking system is in the locked state and
- with at least one clearance zone when the locking system is in the unlocked state.

According to one embodiment, the holding zone and/or the clearance zone is formed in at least one rail.

According to one embodiment, the rail is arranged on the closure wall and the stud is arranged on the support means, or vice versa.

According to one embodiment, the locking system comprises at least one retaining member arranged between the holding zone and the clearance zone.

According to one embodiment, the retaining member has a retaining force threshold that is greater than a force required to move the closure wall and/or the support means along the slide when the locking system is in the locked state.

According to one embodiment, the retaining member is formed by a ball bearing mounted on a spring.

According to one embodiment, an end stop is provided in the closure wall.

According to one embodiment, the end stop is capable of assuming
- a blocking position in which the end stop abuts a part that is fixed in position relative to the support means in order to prevent any relative movement of the closure wall relative to the support means, and
- an unblocking position in which the end stop is disengaged from the part that is fixed relative to the support means in order to allow relative movement of the closure wall relative to the support means.

According to one embodiment, a gripping means, in particular a handle, in particular positioned on a corner of the closure wall, is capable of controlling a movement of the end stop.

The invention also relates to a seat unit that comprises at least one housing and is provided with a closure device according to any of the preceding claims, characterized in that the closure wall, when in a stowed position, is arranged inside the housing.

According to one embodiment, the closure wall is capable of abutting a base of the housing due to gravity when the locking system is in the unlocked state.

According to one embodiment, the base of the housing is covered with a layer of a coating having a low coefficient of friction.

Of course, the various features, variants and/or embodiments of the present invention may be associated with each other in various combinations provided that they are not incompatible or mutually exclusive.

The present invention will be better understood and other features and advantages will become apparent upon reading the following detailed description comprising the embodiments given by way of illustration with reference to the appended drawings, which are provided by way of non-limiting example, which will serve to improve the understanding of the present invention and its implementation and, where appropriate, to contribute to its definition, and in which.

Figure 1:
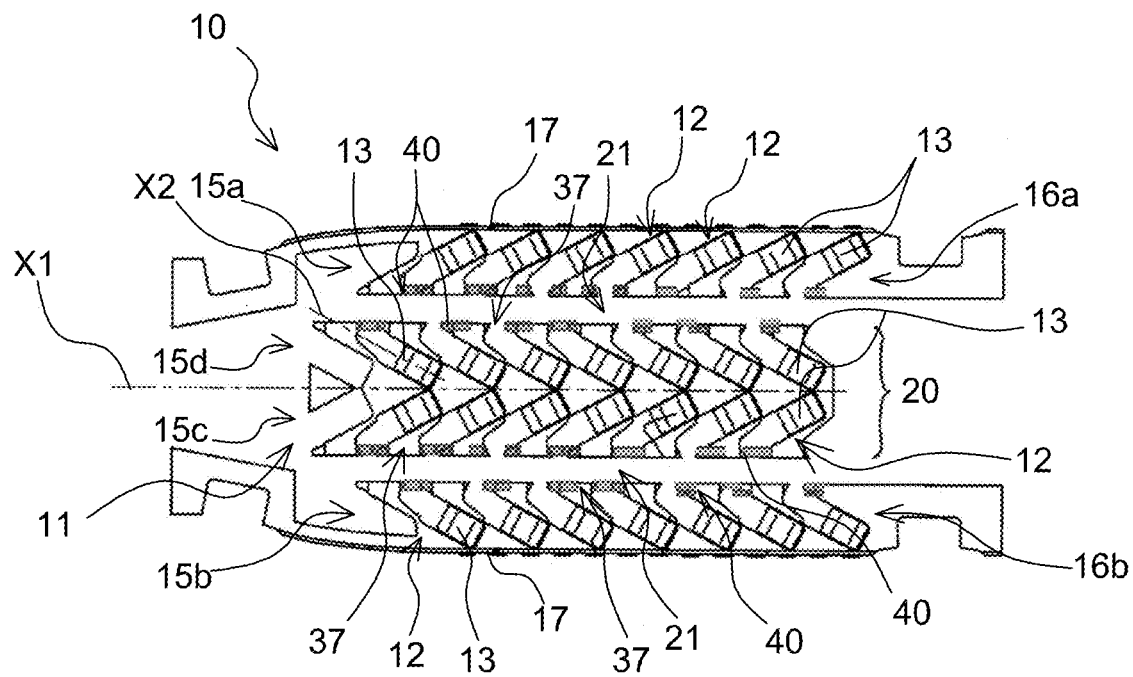
FIG. 1 is a schematic plan view of an aircraft cabin that integrates a seat arrangement according to the present invention.

It should be noted that, in the drawings, the structural and/or functional elements shared by the various embodiments may have the same reference signs. Therefore, unless otherwise stated, such elements have identical structural, dimensional and material properties.

FIG. 1 shows an aircraft cabin 10 extending along a longitudinal axis X1 comprising a seat arrangement 11. The seat arrangement 11 according to the present invention comprises a plurality of seat units 12 each comprising an individual seat 13. Each seat 13 is capable of moving from a "sitting" position corresponding to the position used in particular during the stopping, take-off, and landing phases of the aircraft, and a "lying down" position in which the seat 13 defines a lying plane, which is advantageously substantially horizontal for the passenger. In particular, the "sitting" position and the "lying down" position constitute configurations of the seat 13 in two end positions. According to variants, the seat 13 may also assume intermediate positions, referred to as "relax" positions, between these two end positions.

The plurality of seat units 12 are arranged in at least one row 15a that preferably extends along the longitudinal axis X1 of the aircraft cabin 10. According to the example shown in FIG. 1, the plurality of seat units 12 are arranged in four rows 15a, 15b, 15c and 15d.

According to various particular embodiments, within the row 15a, or the rows 15a, 15b, 15c and 15d, respectively, the seat unit 12 can be oriented such that the seat 13 faces toward the front or the rear of the aircraft.

It should be noted that, in the remainder of the description, the terms "front" and "rear" used in conjunction with the expression "seat unit" locally define a relative position of the seat 13 within the row 15a, or the rows 15a, 15b, 15c and 15d, respectively, and in no way refer to an orientation of the seat 13 within the aircraft cabin 10. In other words, the term "front seat unit" means that the seat unit is positioned directly in front of another seat unit within the row, while the expression "rear seat unit" means that the seat unit is positioned directly behind another seat unit within the row along the longitudinal axis X1 of the aircraft cabin 10.

According to the embodiment shown, the seat arrangement 11 comprises two side groups 16a, 16b comprising seat units 12. The two side groups 16a, 16b are each formed by two rows 15a, 15b of seat units 12 positioned along a side wall 17 of the fuselage of the aircraft cabin 10. The seat arrangement 11 also comprises a central group 20. The central group 20 is preferably formed by two rows 15c, 15d of seat units 12. In such an arrangement, the two rows 15c, 15d of seat units 12 are advantageously laterally adjacent to one another.

The side groups 16a, 16b are each separated from the central group 20 by an aisle 21. According to the configuration shown in FIG. 1, two aisles 21 are thus provided in the aircraft cabin 10, specifically between each side group 16a, 16b and the central group 20. In a variant, the two side groups 16a, 16b may each be formed by a plurality of rows of seat units 12.

Each seat 13 has an extension axis X2 substantially corresponding to a direction of longitudinal extension of the seat 13. In particular, the extension axis X2 corresponds to the direction of longitudinal extension of the seat 13 in the "lying down" position. Advantageously, the extension axis X2 forms a non-zero angle with the longitudinal axis X1 of the aircraft cabin 10.

According to a particular arrangement, each seat 13 faces toward the aisle 21 adjacent to the row 15a, or the rows 15a, 15b, 15c and 15d, respectively. Arranged in this way, each passenger has direct access to the aisle 21 from the seat 13. Direct access to the aisle 21 is made easier by the fact that the passengers' feet are positioned on the side of the aisle 21.

In addition, in the central group 20, two seat units 12 are ideally arranged so as to be laterally contiguous with one another. Advantageously, the two seat units 12 have seats 13 extending in two different directions. Preferably, the respective extension axes X2 of the two seat units 12 form an acute angle therebetween. A configuration of this kind is such that the two seat units 12 form a "V". In particular, a tip of the "V" shape of the two seat units 12 is located behind the backrests 24 of each of the two seat units 12.

It is possible to optimize the aircraft cabin density 10 relative to a width thereof in particular by modifying the angle of the extension axis X2 of the seats 13 relative to the longitudinal axis X1 of the aircraft cabin 10.

According to various embodiments, the axes X2 of the seats 13 form substantially the same angle relative to the longitudinal axis X1 of the aircraft cabin 10. In addition, the extension axes X2 of two adjacent seats 13 of the central group 20 can intersect the longitudinal axis X1 of the aircraft cabin 10 substantially at the same point. Alternatively, the two laterally adjacent seats 13 may be offset relative to each other along the longitudinal axis X1, such that the extension axes X2 of the two laterally adjacent seats 13 intersect the longitudinal axis X1 at different points.

In the example shown, the seats 13 are oriented toward the front of the aircraft cabin 10, that is to say toward a region comprising a cockpit of the aircraft. In an alternative embodiment, the seats 13 are oriented toward the rear of the aircraft cabin 10, that is to say facing away from the region comprising the cockpit.

Figure 2:
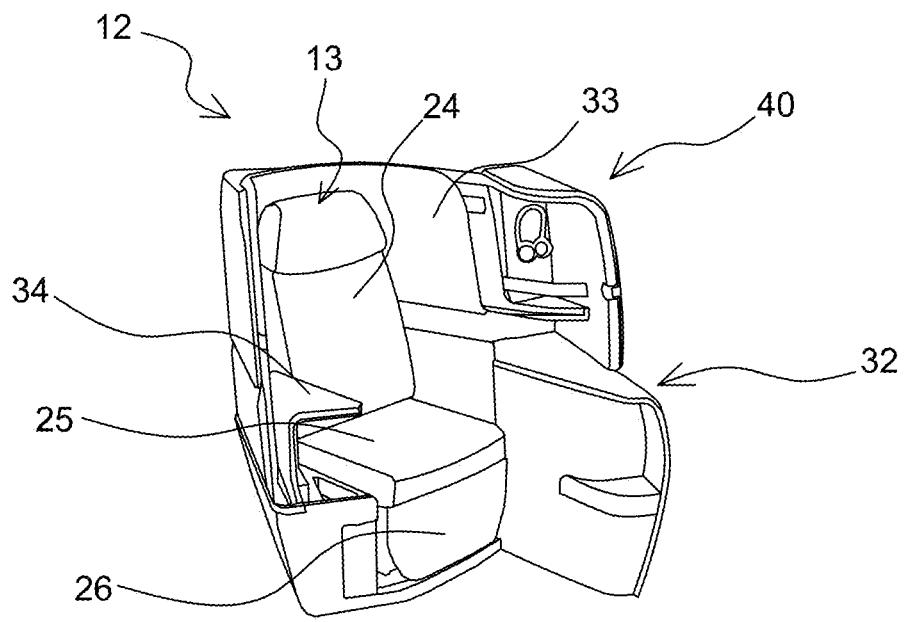
FIG. 2 is a front perspective view of a seat comprising a closure device according to the present invention.

As shown in FIG. 2 in particular, each seat unit 12 comprises a seat 13. According to an advantageous embodiment, the seat 13 comprises a backrest 24, in particular with an adjustable inclination, and a seat surface 25, in particular potentially with an adjustable inclination. In addition, the seat 13 may comprise a leg rest 26, in particular with an adjustable inclination. In addition, the seat unit 12 may comprise a footrest. According to a variant, the footrest may be formed by a fixed cushion, which is in particular arranged in a housing dedicated to receiving the passenger's feet. Alternatively, the footrest may be formed by an element located at the end of the leg rest 26.

The seat unit 12 may also comprise side furniture 32, which can in particular serve as a fixed shelf and/or as tray table storage.

The seat unit 12 may also comprise a fixed shell 33 that is capable of ensuring separation. A fixed shell 33 of this kind thus makes it possible to ensure the privacy of each passenger. Advantageously, in order to fulfil such a function of ensuring privacy, the fixed shell 33 extends around the backrest 24 of the seat 13 in order to create a wholly or partly enclosed interior space in which the seat 13 is arranged.

In addition, the seat unit 12 may comprise an armrest 34. The armrest 34 may be retractable such that it is movable between a "raised" position in which the armrest 34 is capable of supporting a part of the passenger's body, in particular a passenger's arm, and a "stowed" position in which the armrest 34 is capable of being positioned at the same level as the seat surface 25 of the seat 13, in particular when said seat is in a sitting position and/or a "lying down" position. The passenger can thus take advantage of comfort positions by placing, for example, a part of their body, in particular a leg, on the armrest 34 when in the "stowed" position.

In addition, the seat unit 12 may optionally comprise a fixed cushion (not shown). In particular, the fixed cushion allows the lying down surface to be maximized. For this purpose, it is advantageously intended to be positioned in an extension of the seat 13, in particular a lateral extension, when said seat is in the "lying down" position.

As can be seen in particular in FIG. 1, a passage 37, in particular a transverse passage 37, is formed between two consecutive seat units 12 of a row 15a, or the rows 15a, 15b, 15c and 15d, respectively, namely a "front" seat unit 12 and a "rear" seat unit 12. More specifically, according to the embodiment shown, the passage 37 extends between the "rear" seat unit 12 and the "front" seat unit 12.

The passage 37 is arranged to allow the passenger to move from the seat 13 to the aisle 21, in particular when the seat 13 is in the "lying down" position.

According to the present invention, a closure device 40 is capable of ensuring that the passage 37 is closed. A closure device 40 thus makes it possible to define, in particular in cooperation with the fixed shell 33 of the seat unit 12, an enclosed space around the seat 13.

Figure 3A:
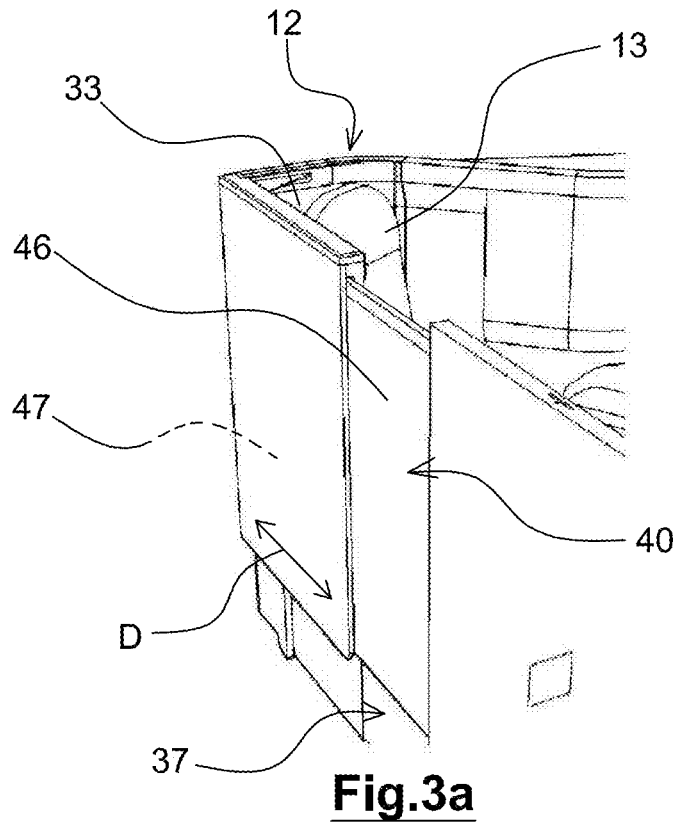
FIGS. 3a and 3b are perspective views, from an aisle, of the seat according to the present invention with the closure device in the extended position and the stowed position, respectively.
Figure 4A:
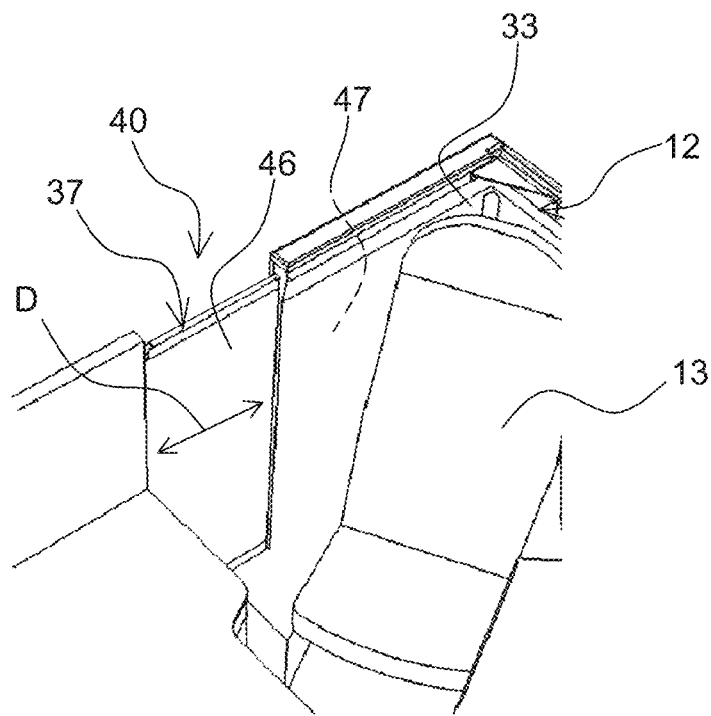
FIGS. 4a and 4b are perspective views from a space in which the seat according to the present invention is arranged, with the closure device in the extended position and the stowed position, respectively.

When the closure device 40 is extended, as shown in particular in FIGS. 3a and 4a, the passage 37 separating two consecutive seat units 12 from the row 15a, or the rows 15a, 15b, 15c, 15d, respectively, is enclosed by the closure device 40. The closure device 40 is capable of moving in a sliding direction D, advantageously a straight sliding direction D.

Therefore, the passenger sitting in the seat 13 is separated from any other passengers and/or crew members walking in the aisle 21 by the closure device 40, which is capable of cooperating with the fixed shell 33 extending around the seat 13. The passenger is thus seated in a privacy area defined by the enclosed space that is thus produced.

Figure 5:
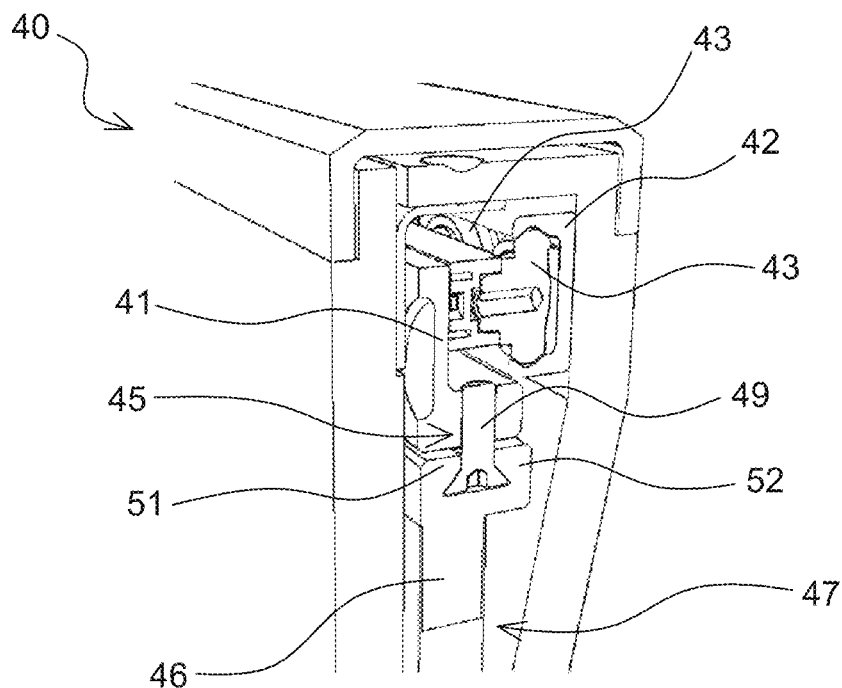
FIG. 5 is a cross section through the closure device according to the present invention.
Figure 6:
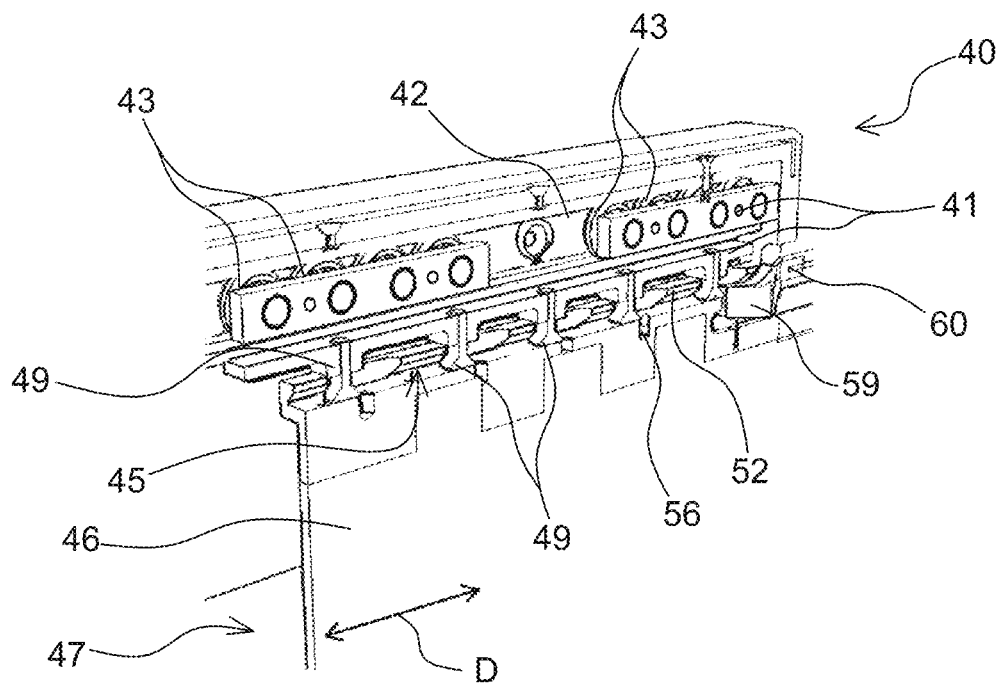
FIG. 6 is a longitudinal section through the closure device according to the present invention.

More specifically, as can be seen in FIGS. 5 and 6, the closure device 40 comprises a support means 41, in particular a carriage, capable of sliding along a slide 42 in the sliding direction D. For this purpose, the support means 41 may, for example, comprise wheels 43 that interact with the slide 42.

A locking system 45 is mounted between the support means 41 and a closure wall 46. In FIGS. 5 and 6, the closure wall 46 is shown so as to be arranged inside a housing 47.

The locking system 45 is capable of assuming a locked state in which the locking system 45 provides a mechanical connection between the closure wall 46 and the support means 41. The closure wall 46 is thus movable, in particular together with the support means 41, in the sliding direction D between a stowed position and an extended position.

Figure 3B:
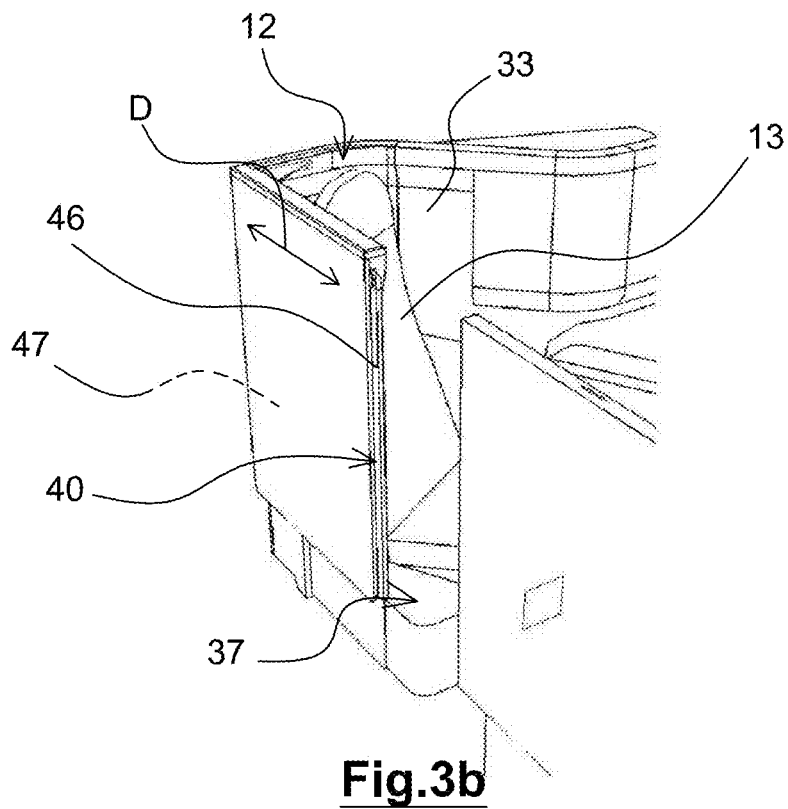
Figure 4B:
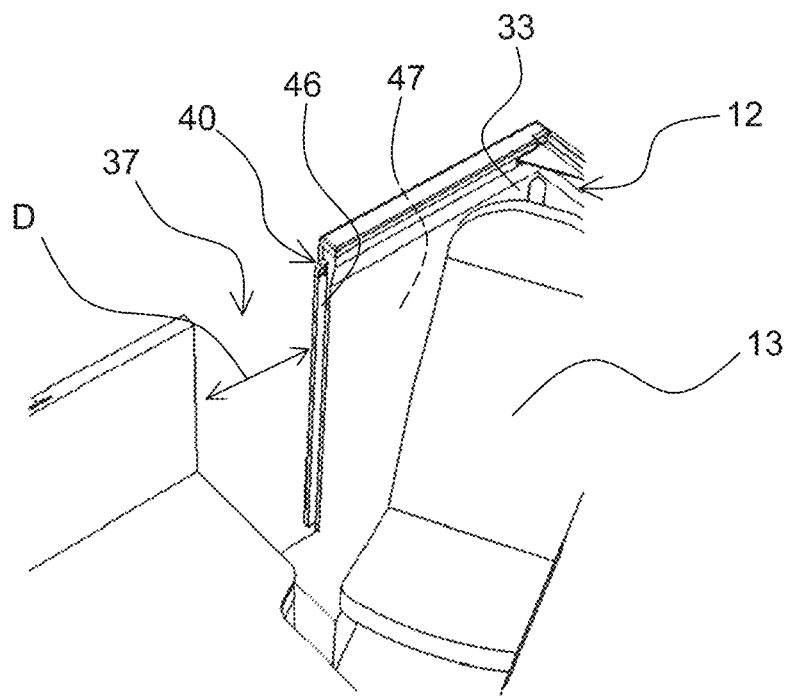

In the stowed position, the closure wall 46 is positioned mainly inside the housing 47. In such an arrangement, the closure wall 46 is able to open at least the majority of the passage 37, as shown in FIGS. 3b and 4b. In the extended position, the closure wall 46 is positioned mainly outside the housing 4. In such an arrangement, the closure wall 46 is able to close at least the majority of the passage 37, as shown in FIGS. 3a and 4a.

In the event of a malfunction of the support means 41, the present invention provides that the locking system 45 is capable of assuming an unlocked state in which the closure wall 46 is disconnected from the support means 41, such that only the closure wall 46 is movable in the sliding direction D between the extended position and the stowed position.

Figure 8A:
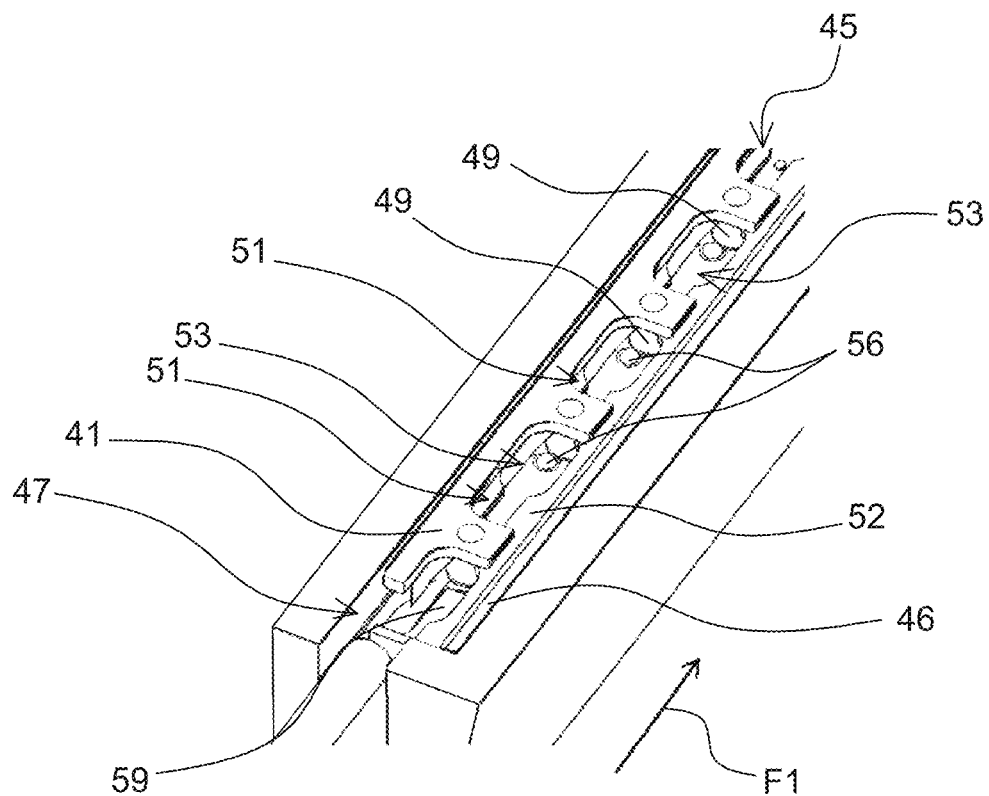
FIGS. 8a and 8b are detailed perspective views of the locking system of the closure device in a locked state and an unlocked state, respectively.
Figure 8B:
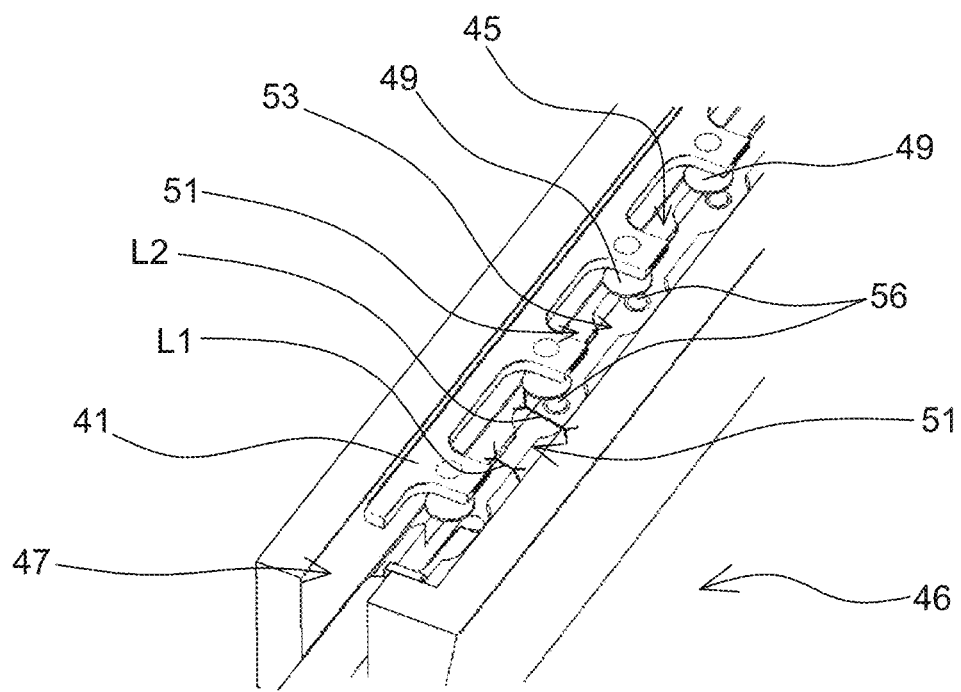

For this purpose, as can be seen in particular in FIGS. 6, 8a and 8b, the locking system 45 comprises studs 49, which are ideally each provided with a projecting head. The studs 49 may, for example, be formed by screws.

The studs 49 are capable of cooperating, on the one hand, with holding zones 51 formed in rails 52 when the locking system 45 is in the locked state, and, on the other hand, with disengagement zones 53 formed in the rails 52 when the locking system 45 is in the unlocked state.

As can be seen in FIG. 8b, in the holding zones 51, a gap L1 between the rails 52 is smaller than the maximum diameter of the heads of the studs 49, such that the closure wall 46 is supported by the studs 49.

In the disengagement zones 53, a gap between the rails 52 is greater than the diameter of the heads of the studs 49, such that a gap is produced that allows the heads of the studs 49 to pass through in order to disconnect the closure wall 46 from the support means 41.

According to an embodiment as shown in FIG. 5, the heads of the studs 49 cooperate with a receiving space arranged under the rails 52 by form-locking, the form being frustoconical in this case.

In the example shown, the rails 52 are arranged on the closure wall 46 and the studs 49 are arranged on the support means 41. More specifically, the rails 52 are arranged on the upper edge of the closure wall 46.

Of course, the structure according to the present invention may be reversed, in that the rails 52 may be arranged on the support means 41 and the studs 49 may be arranged on the closure wall 46.

In addition, as can be seen in particular in FIGS. 8a and 8b, the locking system 45 comprises at least one retaining member 56 arranged between a holding zone 51 and a disengagement zone 53. The retaining member 56 thus makes it possible to prevent the closure wall 46 from inadvertently moving relative to the support means 41. In this case, it is advantageous to provide a plurality of retaining members 56, which are arranged in the receiving spaces for the heads of the studs 49.

The retaining members 56 advantageously have a retaining force threshold that is greater than a force required to move the closure wall 46 and the support means 41 along the slide 42 when the locking system 45 is in the locked state.

The retaining force threshold is between 15 and 60 Newtons, for example. A force threshold of this kind makes it possible to ensure that the locking system 45 moves from the locked state to the unlocked state without great difficulty in the event that a user carries out an action on the closure wall 46.

In a particular embodiment shown, the retaining member 56 is formed by a ball bearing mounted on a spring. The retaining force threshold can be adapted by adjusting the spring setting. In a variant, the retaining member 56 may be formed by a mechanical element that is breakable under a certain force, such as a breakable tongue under the action of a force exerted by the user.

Figure 9A:
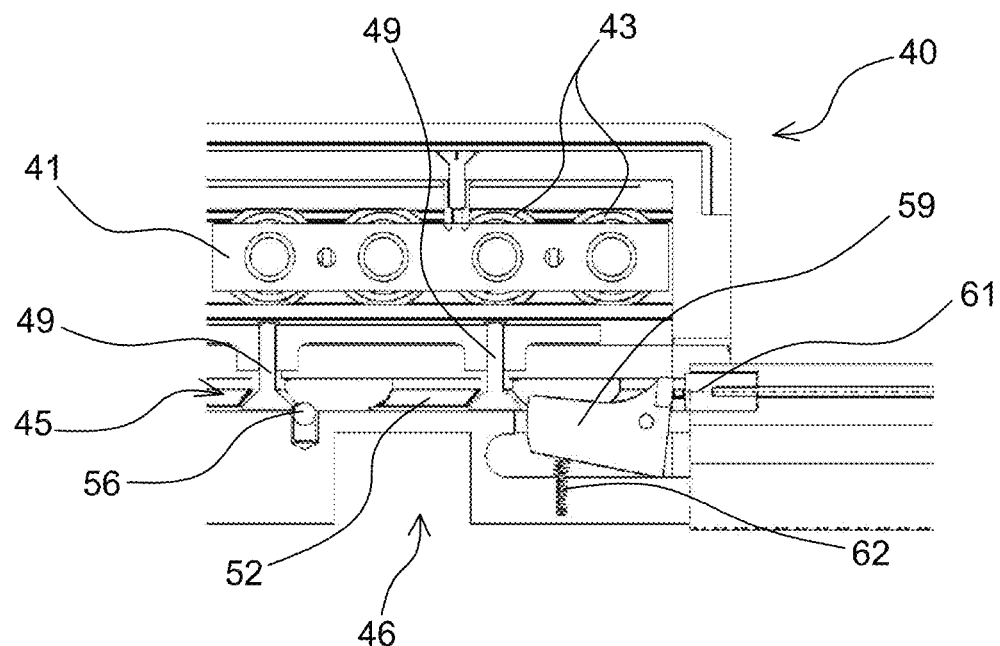
FIGS. 9a and 9b are longitudinal sections through the closure device showing an end stop in a locking position and an unlocking position that allows the closure wall to move, respectively.
Figure 9B:
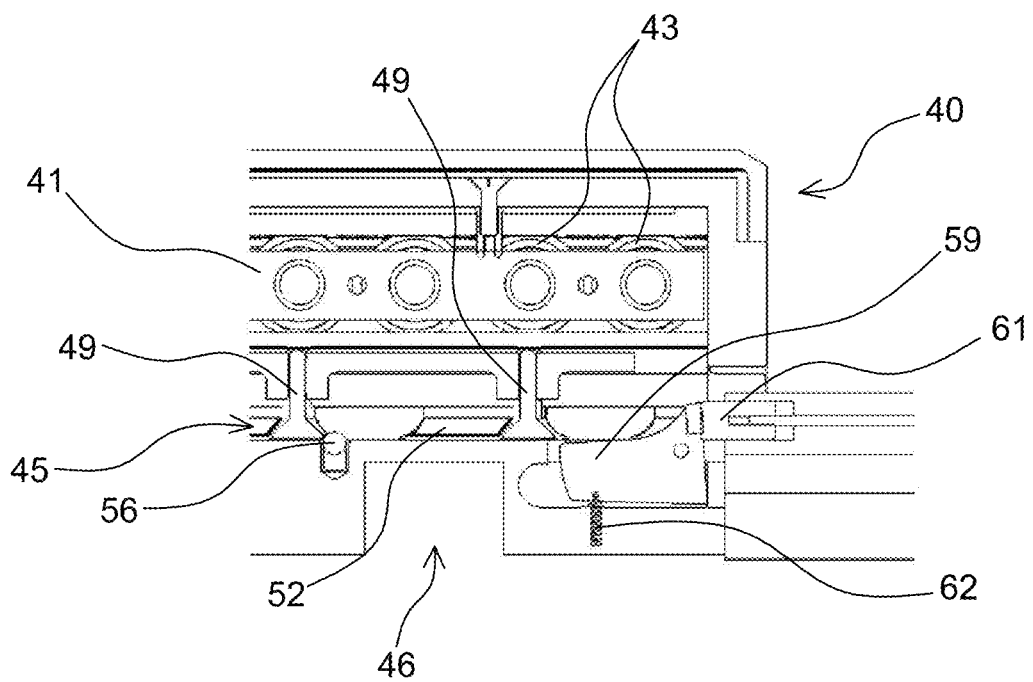

Optionally, an end stop 59 can be provided in the closure wall 46, such as that shown in particular in FIGS. 6, 9a and 9b. The end stop 59 is capable of assuming
- a blocking position in which the end stop 59 abuts a part that is fixed in position relative to the support means 41 in order to prevent any relative movement of the closure wall 46 relative to the support means 41 (as can be seen in particular in FIG. 9a) and
- an unblocking position in which the end stop 59 is disengaged from the part that is fixed relative to the support means 41 in order to allow relative movement of the closure wall 46 relative to the support means 41 (as can be seen in particular in FIG. 9b).

Figure 10A:
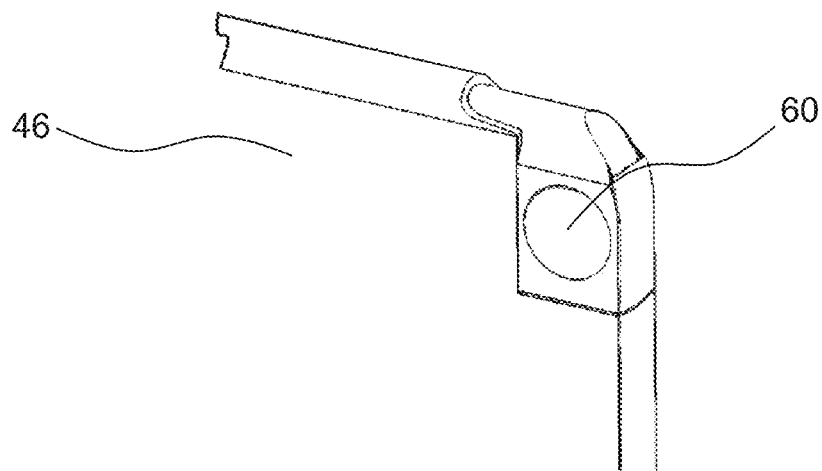
FIGS. 10a and 10b are detailed perspective views of a gripping means allowing the movement of the end stop from one position to another to be controlled.
Figure 10B:
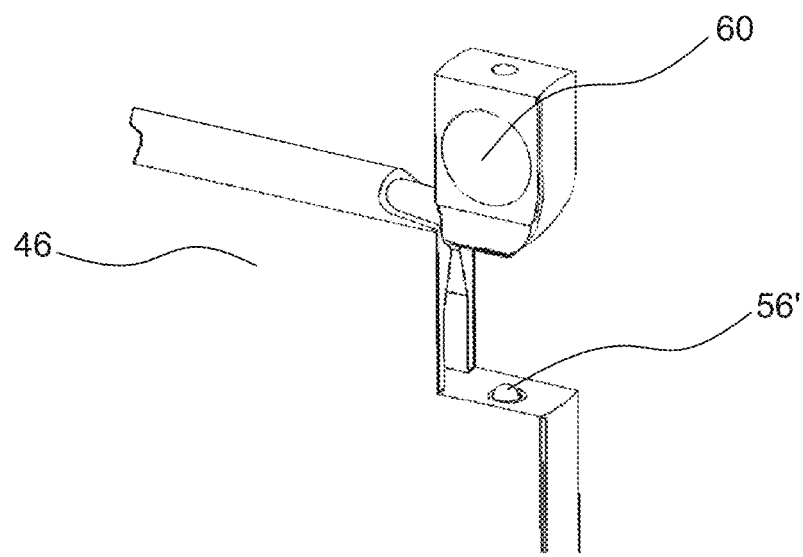

As shown in FIGS. 10a and 10b, a gripping means 60 is capable of controlling the movement of the end stop 59 from the blocking position to the unblocking position. The gripping means 60 is, for example, positioned on a corner of the closure wall 46 and may for example be formed by a handle, in particular a rotary handle, connected to an actuating pin 61 of the end stop 59.

As can be seen in FIGS. 9a and 9b, a resilient member, such as a spring 62, urges the end stop 59 into the blocking position. When the handle 60 is actuated, the actuating pin 61 pushes the end stop 59 such that the end stop 59 compresses the spring 62 so that it enters the inside of its housing and moves into the unblocking position that allows the closure wall 46 to move relative to the support means 41.

The handle 60 can be kept in the rest position by means of a locking ball bearing 56', in particular similar to that used in the locking system 45 as shown in FIG. 10b.

The use of the closure device 40 according to the invention is described below. In normal operation, the locking system 45 is in a locked state, such that the user can easily move the closure wall 46 from one end position (corresponding to the stowed position or the extended position) of the closure wall 46 into the other due to the closure wall 46 being guided by the support means 41, which can slide along the slide 42, as shown in FIGS. 3a, 3b, 4a and 4b.

When emergency situations require the aircraft to be evacuated and/or if the support means 41 is no longer operating properly, the user can operate the gripping means 60 to move the end stop 59 from the blocking position into the unblocking position, as shown in FIGS. 9a and 9b. This makes it possible to allow the closure wall 46 to move relative to the support means 41.

The passenger user can then exert a thrust force F1 on the closure wall 46 toward the inside of the housing 47. When the thrust force F1 exceeds the force exerted by the retaining member 56, the heads of the studs 49 compress the springs such that the retaining members 56 retract into their housing to allow the closure wall 46 to move relative to the support means 41. The closure wall 46 can then be moved until the disengagement zones 53 are in front of the heads of the studs 49, as shown in FIGS. 7a, 7b, 8a and 8b.

Figure 7A:
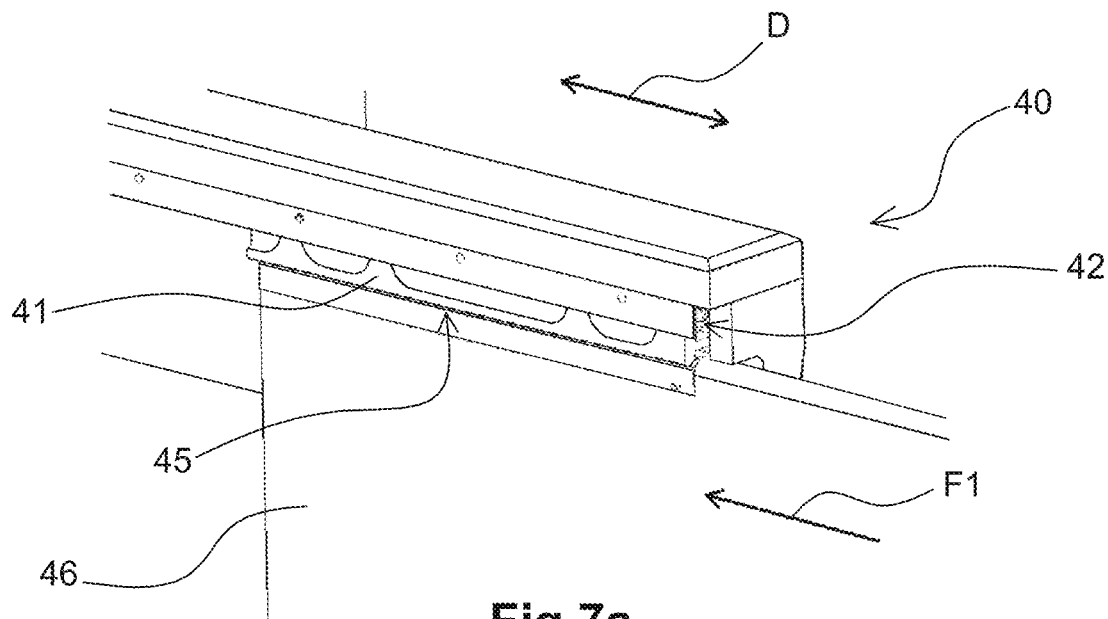
FIGS. 7a and 7b are perspective views of a locking system of the closure device in a locked state and an unlocked state, respectively.
Figure 7B:
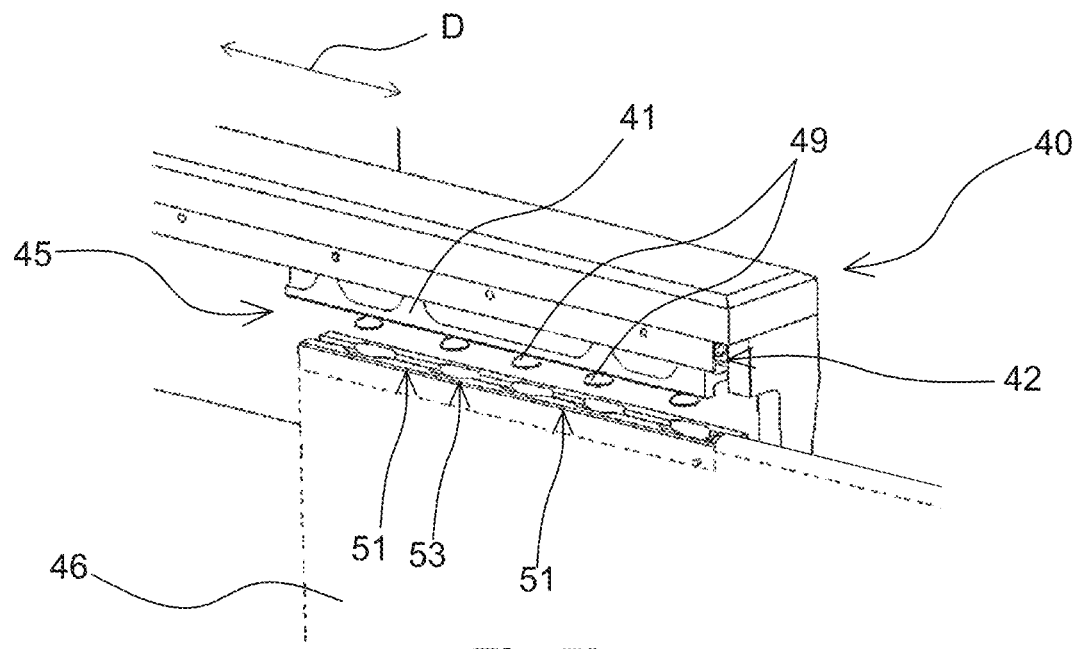
Figure 7C:
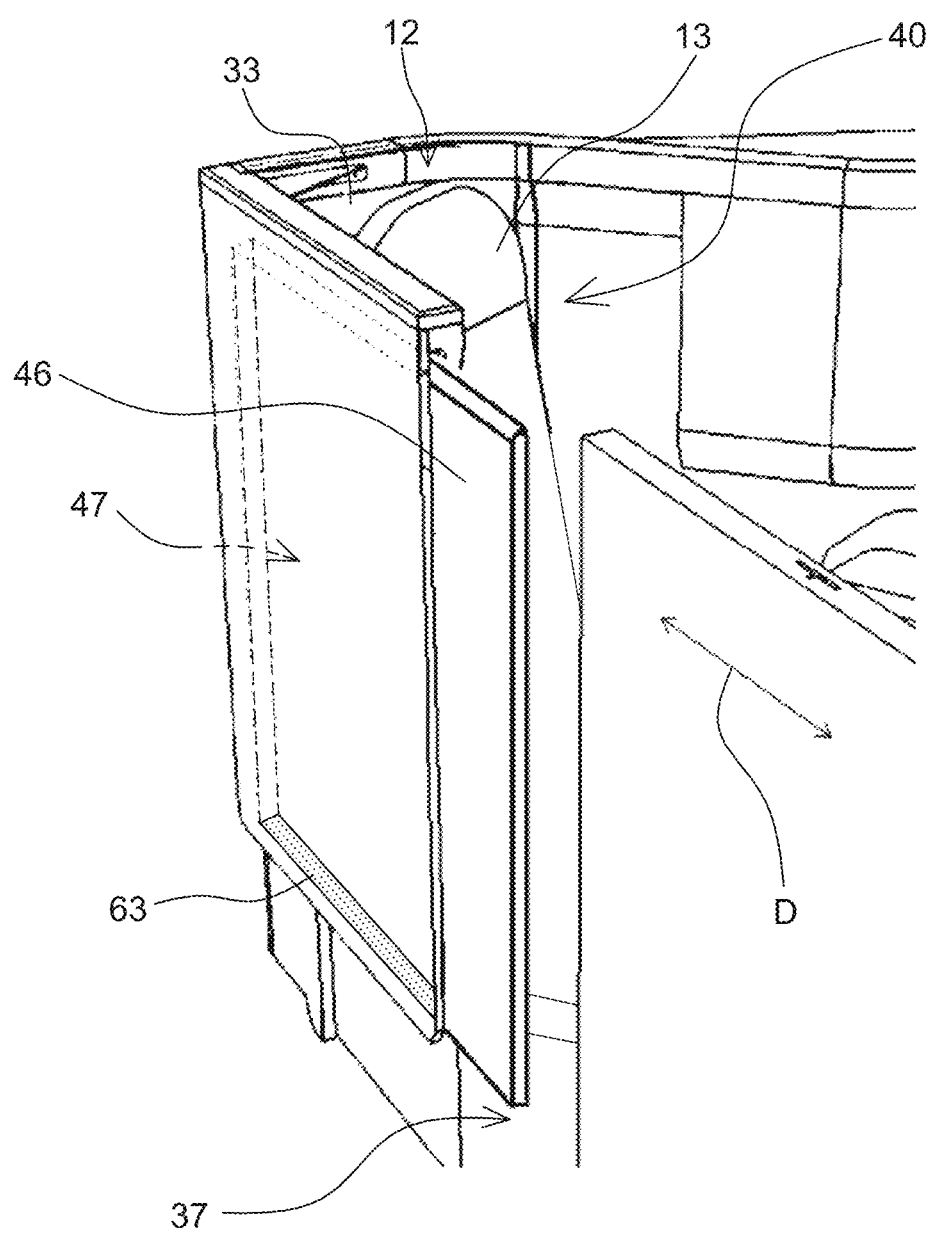
FIG. 7c shows a position of a closure wall within a housing when the locking system is in an unlocked state.

The closure wall 46 is then disconnected from the support means 41 and abuts the base of the housing 47 due to gravity, as shown in FIG. 7c. The locking system 45 is then in the unlocked state.

The user can then slide just the closure wall 46 against the base of the housing 47 in the sliding direction D in order to move it into the stowed position inside the housing 47.

Advantageously, the base of the housing 47 is covered with a layer 63 of a coating having a low coefficient of friction. This coating may for example be formed by Teflon, thermoplastic material, or aluminum/stainless steel having a smooth surface finish.

It should be noted that the present invention is reversible in that, in a reverse operation, it is possible to raise the closure wall 46 onto the support means 41. Thus, to return the locking system 45 to the locked position, the disengagement zones 53 are placed opposite the studs 49. Then, by a vertical upward movement followed by a movement in the sliding direction D, for example toward the outside of the housing 47, the studs 49 come into cooperation with the holding zones 51. In addition, by exerting a force greater than the retaining force, the studs 49 pass over the retaining members 56 such that the closure wall 46 is connected to the support means 41. The end stop 59 can then return to a blocking position.

Furthermore, the end stop 59 and the retaining members 56 may be used independently of one another. Therefore, in a variant, it would be possible to omit the end stop 59. Alternatively, it is also possible to use only the end stop 59 without providing retaining members 56.

Of course, the invention is not limited to the embodiments described above, which are provided solely by way of example. It covers various different modifications, alternative forms and other variants that may be considered by a person skilled in the art in the context of the present invention, and in particular any combination of the different modes of operation described above, which can be taken in isolation or combination.

The invention claimed is:

1. A closure device for closing a passage in an aircraft cabin, comprising:
   - a support means capable of sliding along a slide in a sliding direction,
   - a closure wall capable of closing the passage, and
   - a locking system capable of assuming a locked state in which the locking system provides a mechanical connection between the closure wall and the support means, such that the closure wall is movable together with the support means in the sliding direction, and wherein, in the event of a malfunction of the closure device, the locking system is capable of moving into an unlocked state in which the closure wall is disconnected from the support means, such that only the closure wall is movable in the sliding direction, wherein an end stop is provided in the closure wall, the end stop being capable of assuming:
  a blocking position in which the end stop abuts a part that is fixed in position relative to the support means in order to prevent any relative movement of the closure wall relative to the support means, and
  an unblocking position in which the end stop is disengaged from the part that is fixed relative to the support means in order to allow relative movement of the closure wall relative to the support means.

2. The closure device according to claim 1, wherein the locking system comprises at least one stud provided with a head, which is capable of cooperating:
  with at least one holding zone when the locking system is in the locked state; and
  with at least one disengagement zone when the locking system is in the unlocked state.

3. The closure device according to claim 2, wherein at least one of the holding zone the disengagement zone is formed in at least one rail.

4. The closure device according to claim 3, wherein the rail is arranged on the closure wall and the stud is arranged on the support means, or vice versa.

5. The closure device according to claim 2, wherein the locking system comprises at least one retaining member arranged between the holding zone and the disengagement zone.

6. The closure device according to claim 5, wherein the at least one retaining member has a retaining force threshold that is greater than a force required to move at least one of the closure wall or the support means along the slide when the locking system is in the locked state.

7. The closure device according to claim 5, wherein the at least one retaining member is formed by a ball bearing mounted on a spring.

8. The closure device according to claim 1, wherein a gripping means is positioned on a corner of the closure wall and is capable of controlling a movement of the end stop.

9. A seat unit that comprises at least one housing and is provided with a closure device according to claim 1, wherein the closure wall, when in a stowed position, is arranged inside the at least one housing.

10. The seat unit according to claim 9, wherein the closure wall is capable of abutting a base of the at least one housing due to gravity when the locking system is in the unlocked state.

11. The seat unit according to claim 10, wherein the base of the at least one housing is covered with a layer of a coating having a low coefficient of friction.

* * * * *